ations.
UNITED STATES PATENT OFFICE.

GEORGE M. MOWBRAY, OF NORTH ADAMS, MASSACHUSETTS.

METHOD OF TREATING CAOUTCHOUC.

SPECIFICATION forming part of Letters Patent No. 236,240, dated January 4, 1881.

Application filed June 7, 1880. (Specimens.)

*To all whom it may concern:*

Be it known that I, GEORGE M. MOWBRAY, of North Adams, in the county of Berkshire and State of Massachusetts, have invented a new and useful Method of Treating Caoutchouc; and I do hereby declare that the following is a full and exact description of the same.

The nature of my invention consists in a new method of treating caoutchouc before, during, and after the process known in the art as "mastication," and in the new product arising therefrom.

As heretofore practiced the process of masticating caoutchouc induces a peculiar molecular change, causing the gum to lose its tenacious, elastic, and insulating properties, besides impairing its durability. Such change, once commenced, continues with fatal rapidity under the combined influences of the solar rays and air, nor is it entirely arrested when light is excluded; hence, after mastication by present methods, caoutchouc, being in a condition of gradual decay, is unsuitable as an insulator for the conducting-wires of a submarine cable, and for many other purposes.

My invention obviates this change and preserves unimpaired during and after mastication the valuable properties of elasticity, capacity for resisting conduction, and durability possessed by the natural unmanufactured gum, and further enables a manufacturer to intimately combine with the caoutchouc, treated as described hereinafter, certain other materials, thereby originating a series of new and useful compounds suitable for electric and other purposes; and my invention therein consists in the new processes and new product arising therefrom, which I now proceed to describe.

I first cut caoutchouc into small pieces and free it from moisture in any suitable way. If the final product is required to be nearly pure caoutchouc, with slight admixture of foreign matter, then to twenty (20) pounds of the gum I add from five (5) to ten (10) pounds of naphthaline. If, however, the final product sought be caoutchouc in combination with a large proportion of other materials, in that case to twenty pounds of caoutchouc I add from fifteen to twenty pounds of naphthaline. I place the pieces of cut caoutchouc and naphthaline in a covered copper pan heated by steam or boiling water, and digest these together for a period of from twenty-four to forty-eight hours at a temperature between 180° and 230° Fahrenheit. After the digestion is completed I introduce the hot mass, before its temperature lowers to 175° Fahrenheit, into a machine for masticating, which has been previously heated to 212° Fahrenheit, taking care to maintain the temperature of the compound during mastication between 212° and 230° Fahrenheit until it forms a plastic homogeneous compound, which I term "masticated naphthalized caoutchouc."

If it is desired to form a new series of compounds with this naphthalized caoutchouc, I proceed as follows, viz: While the masticating process just described is going on I dissolve in melted and, if necessary, in boiling naphthaline such materials as are soluble therein which I wish to combine with the caoutchouc—for instance, sulphur, sulphide of antimony, of arsenic, and of tin, colophony, the resins dammar, sandarac, shellac, amber, New Zealand kauri, bitumen, or asphaltum, all of which easily dissolve in naphthaline; or mercuric chloride, mercuric iodide, arsenious oxide, succinic, benzoic, or oxalic acids, indigo, &c., which dissolve less readily—and combine any or several of these solutions (first lowering their temperature, however, to 240° Fahrenheit) before adding them to the hot naphthalized caoutchouc in the masticator. After being so added, about fifteen minutes' time masticating is usually sufficient to form of them a homogeneous compound. Cresylic and carbolic acids may be added without previous solution in naphthaline, it being simply necessary to heat them to 212° Fahrenheit before introducing them into the masticator which contains the hot naphthalized caoutchouc.

By varying the ingredients above specified and their proportions a series of new and useful naphthalized-caoutchouc compounds can be made. Materials which are insoluble in naphthaline—such as the oxides of lead, of zinc, of tin, oxalate of lime, the sulphates of lime, of barytes, dry paper-pulp fiber, cotton, coloring-matters, chalk, rotten-stone, &c., required either to give solidity, increased hardness, color, or durability to the product—should first be deprived of moisture in any suitable way and heated to 212° Fahrenheit before they are introduced into the masticating mass; otherwise less perfect mixture ensues.

Naphthalized caoutchouc, either alone or combined with materials soluble in naphthaline, or simply mixed with material not soluble in naphthaline, before cooling to 176° Fahrenheit, may be rolled between rolls, steam-heated to about 212° Fahrenheit, so as to form sheets, or between woven or felted fibrous fabric, or over paper or sheet wire-gauze, or perforated metal for harness-mounting, or introduced into an electric-wire-covering machine and pressed through a die over wires, forming a seamless envelope thereon, or pressed through an annular opening, either alone to form tubing, which may be cut into bands or rings, or to serve for cartridges or cases for fixed ammunition, or pressed through an annular opening with a woven fabric or spirally-turned wire, to form tubing impermeable to water, or pressed into molds, &c. In brief, the various compositions of matter made by the processes herein described may be shaped by many of the well-known methods used in the manufacture of rubber goods into a great variety of forms for a great variety of uses. Having received the desired form, the compound must now be exposed to a current of warm air at a temperature between 60° and 120° Fahrenheit from ten to forty days, to be determined by the thickness of the mass, until the persistent odor of the naphthaline has departed. This exposure evaporates nearly all the naphthaline, leaving the caoutchouc and other materials intimately combined.

It will be observed that the caoutchouc itself thus treated possesses the same properties as the natural gum itself, unchanged in respect to elasticity, durability, and extreme flexibility.

In order to manufacture a very superior quality of vulcanized rubber, either soft or hard, naphthalized caoutchouc is combined with its required proportion of sulphur or sulphides, in the mode above described. Then the excess of naphthaline is evaporated by exposure to a current of warm air, as directed. The combination of caoutchouc and sulphur, or of caoutchouc and sulphide, is then submitted to a temperature varying from 280° to 320° Fahrenheit for the required length of time to effect the proper degree of vulcanization, the production of hard or soft rubber depending on the proportion of sulphur more or less, and also the higher or lower degree of temperature, together with the greater or less length of time the compound is exposed to heat, as is well known to the trade.

Having thus described my invention, what I claim as new therein, and desire to secure by Letters Patent of the United States, is as follows:

1. The process of treating caoutchouc with melted naphthaline, substantially as and for the purposes set forth.

2. The process of masticating naphthalized caoutchouc, substantially as and for the purposes set forth.

3. The process of combining with naphthalized caoutchouc materials soluble in naphthaline, substantially as and for the purpose set forth.

4. The process of mixing with naphthalized caoutchouc materials not soluble in naphthaline, substantially as and for the purposes set forth.

5. As a new product, naphthalized caoutchouc, either alone or in combination or mixed with other materials herein mentioned, or their equivalents, rolled, molded, pressed, or covering or forming articles, substantially as described, and for the purposes set forth.

6. The process of removing naphthaline by spontaneous evaporation from naphthalized caoutchouc, either alone or in combination or mixed with other materials, whether the same be in mass or has been worked into forms by molding, pressing, rolling, or covering metals, substantially as described, and for the purposes set forth.

7. The process of subjecting naphthalized caoutchouc which has been combined with sulphur or sulphides, after removing excess of naphthaline by evaporation, to the further process of hard or soft vulcanization, substantially as and for the purposes set forth.

This specification signed and witnessed this 2d day of June, 1880.

GEO. M. MOWBRAY.

Witnesses:
 W. B. HOUGHTON,
 JAMES WHITE.